(12) United States Patent
Shih et al.

(10) Patent No.: US 12,000,525 B2
(45) Date of Patent: Jun. 4, 2024

(54) DISPLAY STAND HOLDER WITH SLIDE RAIL STRUCTURE AND DISPLAY APPARATUS THEREOF

(71) Applicant: GIGA-BYTE TECHNOLOGY CO., LTD., New Taipei (TW)

(72) Inventors: Po-Jen Shih, New Taipei (TW); Chien-Min Wang, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 187 days.

(21) Appl. No.: 17/709,449

(22) Filed: Mar. 31, 2022

(65) Prior Publication Data
US 2022/0412502 A1    Dec. 29, 2022

(30) Foreign Application Priority Data

Jun. 28, 2021  (TW) .................................. 110123642

(51) Int. Cl.
*F16M 11/04*  (2006.01)
*F16M 11/12*  (2006.01)

(52) U.S. Cl.
CPC ........... *F16M 11/046* (2013.01); *F16M 11/12* (2013.01); *F16M 2200/06* (2013.01)

(58) Field of Classification Search
CPC ............... F16M 11/10; F16M 11/2085; F16M 11/2092; F16M 11/046; F16M 11/045; F16M 11/105; F16M 11/12; F16M 2200/06; F16M 2200/063
USPC .................................. 248/415–416, 919–920
See application file for complete search history.

(56) References Cited

U.S. PATENT DOCUMENTS

| 7,336,478 B2 * | 2/2008 | Jang ...................... G06F 1/1601 248/920 |
| 7,497,410 B2 * | 3/2009 | Lee ...................... F16M 11/046 248/295.11 |
| 7,593,218 B2 * | 9/2009 | Hwang .............. F16M 11/2021 361/679.21 |

(Continued)

FOREIGN PATENT DOCUMENTS

| TW | M540227 U | 4/2017 |
| TW | I721676 B | 3/2021 |

OTHER PUBLICATIONS

Extended European Search Report of the corresponding European patent application No. 22172499.0 mailed on Oct. 28, 2022.

*Primary Examiner* — Ingrid M Weinhold
(74) *Attorney, Agent, or Firm* — Idea Intellectual Limited; Margaret A. Burke; Sam T. Yip

(57) ABSTRACT

A display stand holder with slide rail structure includes a stand body, a pivot member, a display assembly module, and one or more constant-force springs. The stand body has a top end. The pivot member has a first end and a second end. The first end is provided with a pivot portion. The pivot portion is pivotally connected to the top end of the stand body, and the second end is away from the top end with respect to the first end. The display assembly module is disposed at the second end of the pivot member. The display module includes a slide rail structure. The slide rail structure includes a guide member and a slide member, and the slide member is slidably assembled on the guide member. The constant-force spring is connected between the guide member and the slide member.

25 Claims, 15 Drawing Sheets

(56) References Cited

U.S. PATENT DOCUMENTS

| | | | |
|---|---|---|---|
| 8,047,490 B2* | 11/2011 | Xing | F16M 11/10 |
| | | | 248/920 |
| 8,104,728 B2 | 1/2012 | Chen | |
| 8,149,572 B2* | 4/2012 | Shen | F16M 11/105 |
| | | | 248/920 |
| 10,746,347 B2* | 8/2020 | Li | H05K 5/0017 |
| 11,825,582 B1* | 11/2023 | Liu | H05B 47/19 |
| 2006/0238966 A1* | 10/2006 | Sung | F16M 11/2057 |
| | | | 361/679.05 |
| 2007/0262209 A1* | 11/2007 | She | F16M 11/2057 |
| | | | 248/122.1 |
| 2008/0192417 A1* | 8/2008 | Hwang | F16M 11/38 |
| | | | 361/679.06 |
| 2011/0108698 A1 | 5/2011 | Chen | |
| 2019/0376639 A1* | 12/2019 | Bowman | F16M 11/24 |
| 2022/0252208 A1* | 8/2022 | Huang | F16M 11/2021 |

\* cited by examiner

DISPLAY STAND HOLDER WITH SLIDE RAIL STRUCTURE AND DISPLAY APPARATUS THEREOF

CROSS-REFERENCE TO RELATED APPLICATION

This non-provisional application claims priority under 35 U.S.C. § 119(a) to patent application Ser. No. 11/012,3642 in Taiwan, R.O.C. on Jun. 28, 2021, the entire contents of which are hereby incorporated by reference.

BACKGROUND

Technical Field

The instant disclosure relates to a stand holder, in particular, to a display stand holder with a slide rail structure and a display apparatus thereof.

Related Art

Displays are common electronic apparatuses. During the use of the display, usually the display is assembled on a supporting holder, so that the display can be fixed stably. Moreover, in order to adjust the position of the display to meet different user requirements, a slide rail structure is correspondingly provided between the supporting holder and the display.

SUMMARY

However, regarding the slide rail structure known to the inventor, the slide rail structure is disposed on the body of the supporting holder. As a result, after the supporting holder is assembled with the slide rail structure, the distance between the display and the slide rail structure is too short. Consequently, the tilt angle of the display with respect to the supporting holder cannot be adjusted, or the tilt angle is greatly limited and thus can merely be adjusted within a very small range. Moreover, since the slide rail structure is disposed on the supporting holder, the structure of the supporting holder becomes too complicated, and the appearance of the supporting holder is also limited.

In view of this, in one embodiment, a display stand holder with slide rail structure is provided. The display stand holder comprises a stand body, a pivot member, a display assembly module, and at least one constant-force spring. The stand body has a top end. The pivot member has a first end and a second end. The first end is provided with a pivot portion. The pivot portion is pivotally connected to the top end of the stand body, and the second end is away from the top end with respect to the first end. The display assembly module is disposed at the second end of the pivot member. The display module comprises a slide rail structure. The slide rail structure comprises a guide member and a slide member, and the slide member is slidably assembled on the guide member. The at least one constant-force spring is connected between the guide member and the slide member.

In some embodiments, the display assembly module comprises a display assembly plate. The guide member is fixed on the second end of the pivot member, and the slide member is connected to the display assembly plate, so that the display assembly plate and the slide member are slidable together with respect to the guide member.

In some embodiments, the display assembly module is further rotatably assembled on the slide rail structure.

In some embodiments, the display assembly plate has an axial through hole, a damper plate is fixed disposed in the axial through hole, and the damper plate contact the display assembly plate.

In some embodiments, the display assembly plate has a ring-shaped damper sheet, and the ring-shaped damper sheet is disposed around a hole edge of the axial through hole and contacts the damper plate.

In some embodiments, the display assembly module comprises a ring-shaped frame, the ring-shaped frame is connected to a periphery of the display assembly plate to form a receiving groove, and the slide rail structure is received in the receiving groove.

In some embodiments, one side of the receiving groove adjacent to the pivot member is provided with a cover plate, the cover plate has an elongated guide slot, the second end of the pivot member is assembled with a slider, and the slider is inserted into the elongated guide slot.

In some embodiments, the slide member has a slide groove, the guide member comprises a guide plate, and the guide plate is received in the slide groove.

In some embodiments, a plurality of balls is in the slide groove, and the balls rollably contact the guide plate.

In some embodiments, the slide member has a second slide groove. The guide member comprises a guide block, the guide block is received in the second slide groove, the guide block has a recess, and the at least one constant-force spring is received in the recess.

In some embodiments, the pivot member is further provided with a rotation shaft between the first end and the second end, and an axial direction of the rotation shaft is perpendicular to an axial direction of the pivot portion.

In some embodiments, the display stand holder further comprises an elastic member connected between the first end of the pivot member and the stand body.

In some embodiments, the display stand holder further comprises a base. The stand body has a bottom end, the bottom end is pivotally connected to the base, and the base is adapted to be fixed on a desk plate or a desk clip.

In some embodiments, the display stand holder further comprises an elastic member connected between the base and the stand body.

In some embodiments, the display stand holder further comprises a multi-link assembly. The multi-link assembly comprises a first connecting rod, a second connecting rod, a third connecting rod, and a fourth connecting rod. The first connecting rod is connected to the pivot portion of the pivot member, and the second connecting rod is connected to the base. The third connecting rod and the fourth connecting rod are parallel with each other, two ends of the third connecting rod are pivotally connected to the first connecting rod and the second connecting rod, and two ends of the fourth connecting rod are pivotally connected to the first connecting rod and the second connecting rod.

In some embodiments, the display stand holder further comprises a friction sheet, and the friction sheet contacts the first end of the pivot member and the top end of the stand body.

In some embodiments, the display stand holder further comprises an angular limit plate. The angular limit plate is disposed between the first end of the pivot member and the top end of the stand body. The angular limit plate has a limit notch, the first end of the pivot member is provided with a limit block, and the limit block is in the limit notch.

In another embodiment, a display apparatus is further provided. The display apparatus comprises the afore-mentioned display stand holder and a display. The display has a front surface and a rear surface. The rear surface is provided with an assembly groove, and the display assembly module is assembled in the assembly groove.

Based on the above, according to one or some embodiments of the display stand holder, the slide rail structure of the display assembly module is disposed at the end of the pivot member away from the stand body. Therefore, the position of the display can be adjusted according to different user requirements. Moreover, after the position of the display is adjusted, the display can be positioned by the constant-force spring. Moreover, according to one or some embodiments, the adjustable angular range of the display is increased, the structure of the stand body is simplified, and the appearance of the stand body is not limited.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
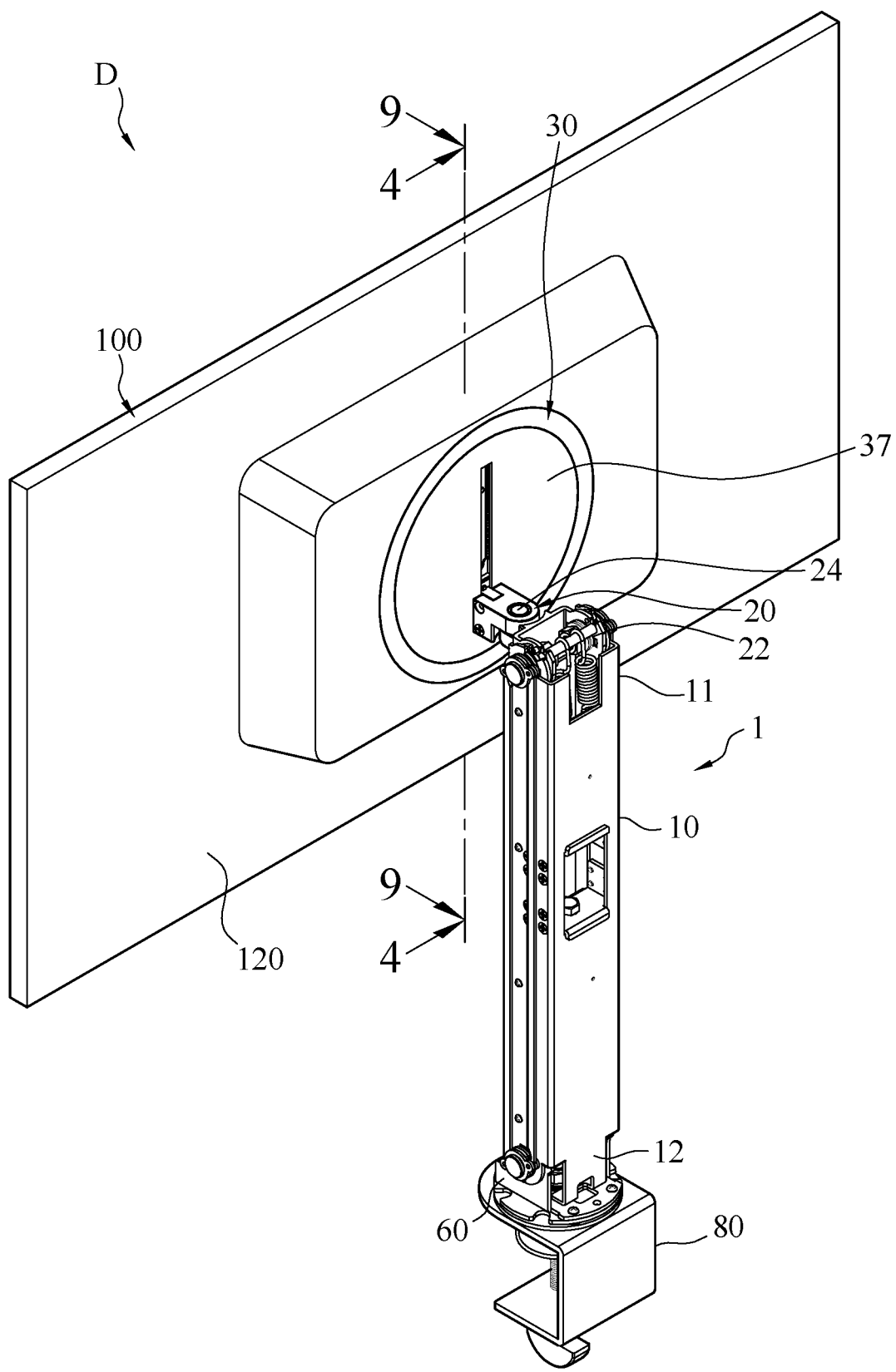
FIG. 1 illustrates a perspective view of a display apparatus according to an exemplary embodiment of the instant disclosure.

Please refer to FIG. 1 to FIG. 4. A display apparatus D according to an exemplary embodiment of the instant disclosure is illustrated. The display apparatus D comprises a display stand holder 1 and a display 100. In some embodiments, the display 100 may be a plasma display, a liquid-crystal display, a light-emitting-diode display, or other flat panel displays.

As shown in FIG. 1 to FIG. 4, the display stand holder 1 comprises a stand body 10, a pivot member 20, a display assembly module 30, and at least one constant-force spring 40.

Figure 2:
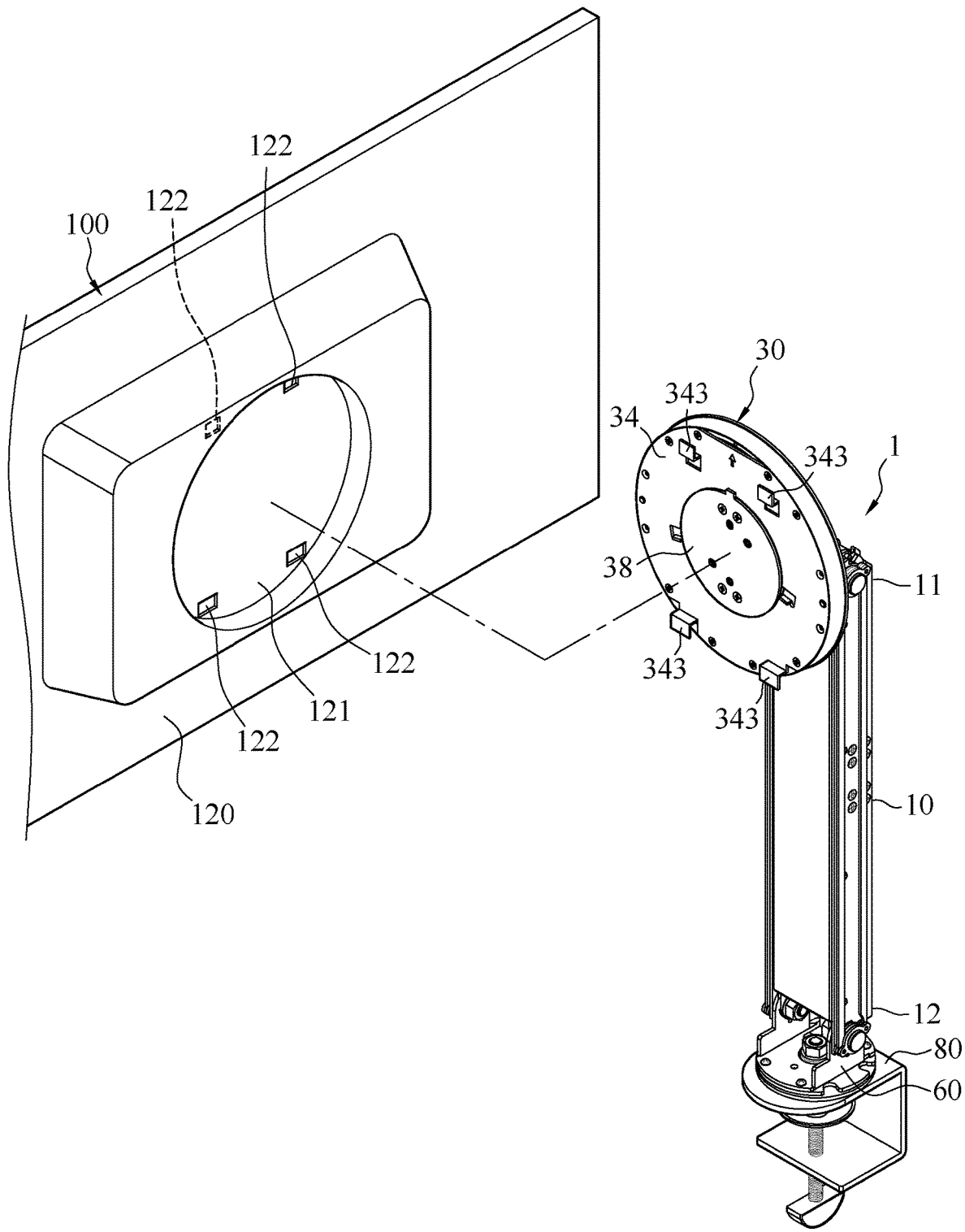
FIG. 2 illustrates an exploded view of the display apparatus of the exemplary embodiment.

As shown in FIG. 1 to FIG. 4, the stand body 10 is of an elongated bar shape and has a top end 11 and a bottom end 12. The bottom end 12 is adapted to be fixed to an object, and the object may be, for example, a desk, a wall, or a floor. The top end 11 and the bottom end 12 are two opposite ends of the stand body 10. In some embodiments, the stand body 10 is a standing-type fixing component (as shown in FIG. 1 and FIG. 2) or an inclined-type fixing component.

As shown in FIG. 1 to FIG. 4. The pivot member 20 may be a block, a plate, a bar, a rod, or the like and has a certain length. The pivot member 20 has a first end 21 and a second end 23. The first end 21 is provided with a pivot portion 22. The pivot portion 22 may be a pivot shaft or a pivot hole and is pivotally connected to the top end 11 of the stand body 10. Therefore, when the pivot member 20 is subjected to a force, the pivot member 20 swings about the pivot portion 22 with respect to the top end 11 of the stand body 10. Moreover, the second end 23 of the pivot member 20 is farer from the top end 11 as compared to the first end 21 of the pivot member 20 (in other words, in this embodiment, the distance between the second end 23 and the top end 11 is greater than the distance between the first end 21 and the top end 11). Therefore, the second end 23 is spaced from the top end 11. The distance between the second end 23 and the top end 11 is determined according to the length of the pivot member 20. In other words, in this embodiment, the longer the pivot member 20 is, the greater the distance between the second end 23 and the top end 11 is.

As shown in FIG. 1 to FIG. 4, the display assembly module 30 is disposed at the second end 23 of the pivot member 20 for assembling with the display 100. For example, in this embodiment, the display 100 has a front surface 110 and a rear surface 120, the rear surface 120 is provided with an assembly groove 121, and the display assembly module 30 is assembled in the assembly groove 121. Therefore, after the display 100 is assembled with the display assembly module 30, the appearance of the assembled product can be more flat and beautiful.

In some embodiments, the display 100 and the display assembly module 30 may be assembled and fixed with each other through magnetic attracting or buckling manners. Therefore, the display 100 and the display assembly module 30 can be assembled with and disassembled from each other quickly, but embodiments are not limited thereto. In some embodiments, the display 100 and the display assembly module 30 may be assembled and fixed with each other through locking or interference fitting manners. For example, as shown in FIG. 2, in this embodiment, the display assembly module 30 comprises a display assembly plate 34. A plurality of hooks 343 is disposed on the display assembly plate 34, a plurality of buckle holes 122 is in the assembly groove 121 of the display 100, and the hooks 343 of the display assembly plate 34 are correspondingly buckled with the buckle holes 122 of the assembly groove 121 of the display 100. Therefore, the display assembly module 30 can be assembled in the assembly groove 121 quickly, and the display 100 can be detached from the display assembly module 30 quickly if necessary.

As shown in FIG. 1 to FIG. 4, the display assembly module 30 comprises a slide rail structure 31. The slide rail structure 31 comprises a guide member 32 and a slide member 33. The slide member 33 is slidably assembled on the guide member 32, so that the slide member 33 is slidable with respect to the guide member 32. In this embodiment, the guide member 32 is fixed at the second end 23 of the pivot member 20, and the slide member 33 is connected to the display assembly plate 34, so that the display assembly plate 34 and the slide member 33 are slidable together with respect to the guide member 32. Therefore, after the display 100 is assembled with the display assembly plate 34, the display 100 is capable of being slid with respect to the guide member 32 and the stand body 10 through the slide member 33, so that the position of the display 100 can be adjusted to meet different user requirements.

As shown in FIG. 1 to FIG. 4, the constant-force spring 40 is connected between the guide member 32 and the slide member 33. In this embodiment, the constant-force spring 40 is curled. Moreover, when the display 100 slides with respect to the guide member 32 and the stand body 10 through the slide member 33, one end of the constant-force spring 40 is subjected to a force, so that the constant-force spring 40 is pulled to be flat. Furthermore, the constant-force spring 40 can provide an elastic force constantly, and the value of the elastic force is balanced with the total weight of the display 100, the display assembly plate 34, the slide member 33, and other movable components (if any). Therefore, when the display 100 is adjusted to different positions, the display 100 can be positioned through the elastic force of the constant-force spring 40.

Figure 4:
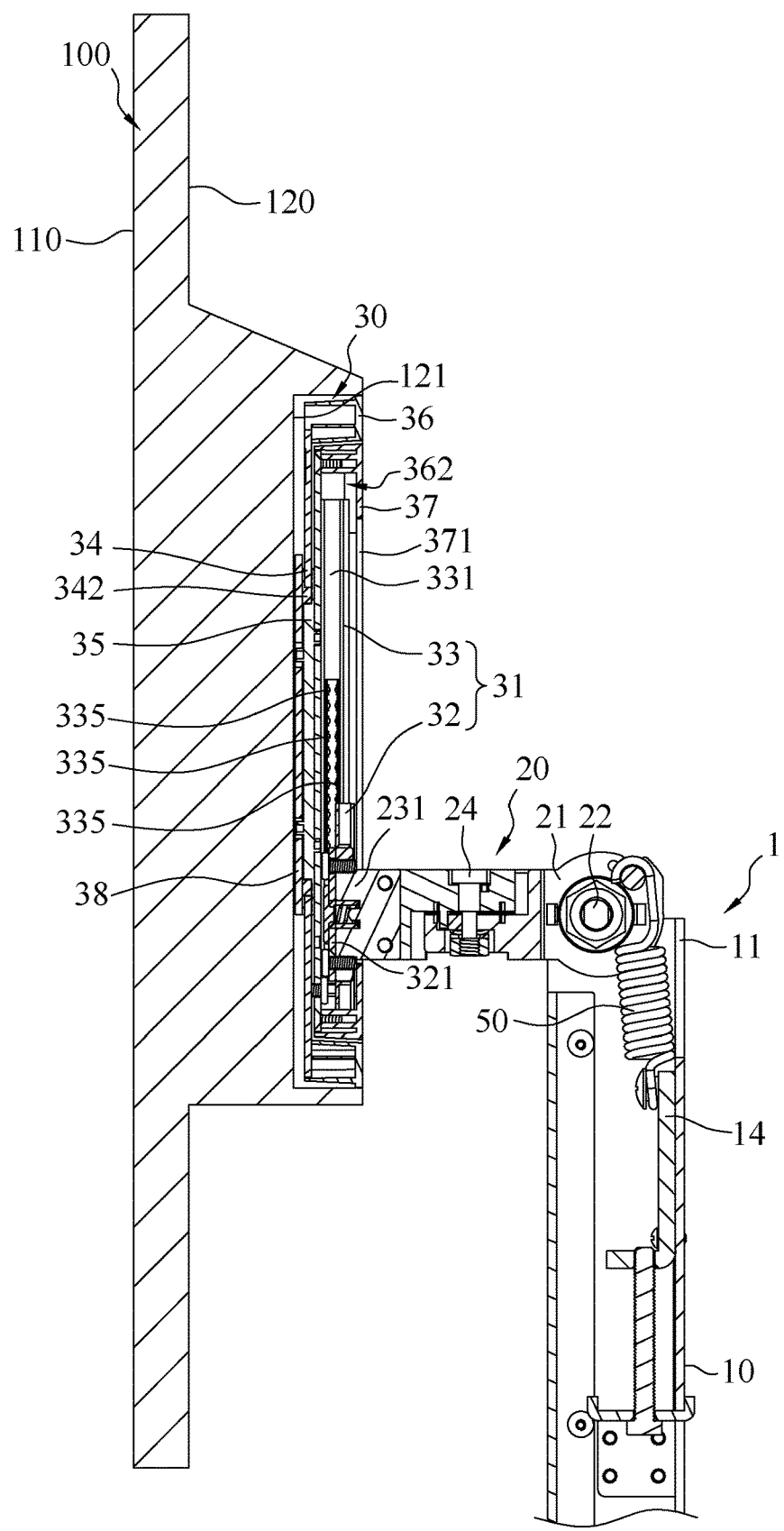
FIG. 4 illustrates a cross-sectional view of the display apparatus along line 4-4 shown in FIG. 1.
Figure 5:
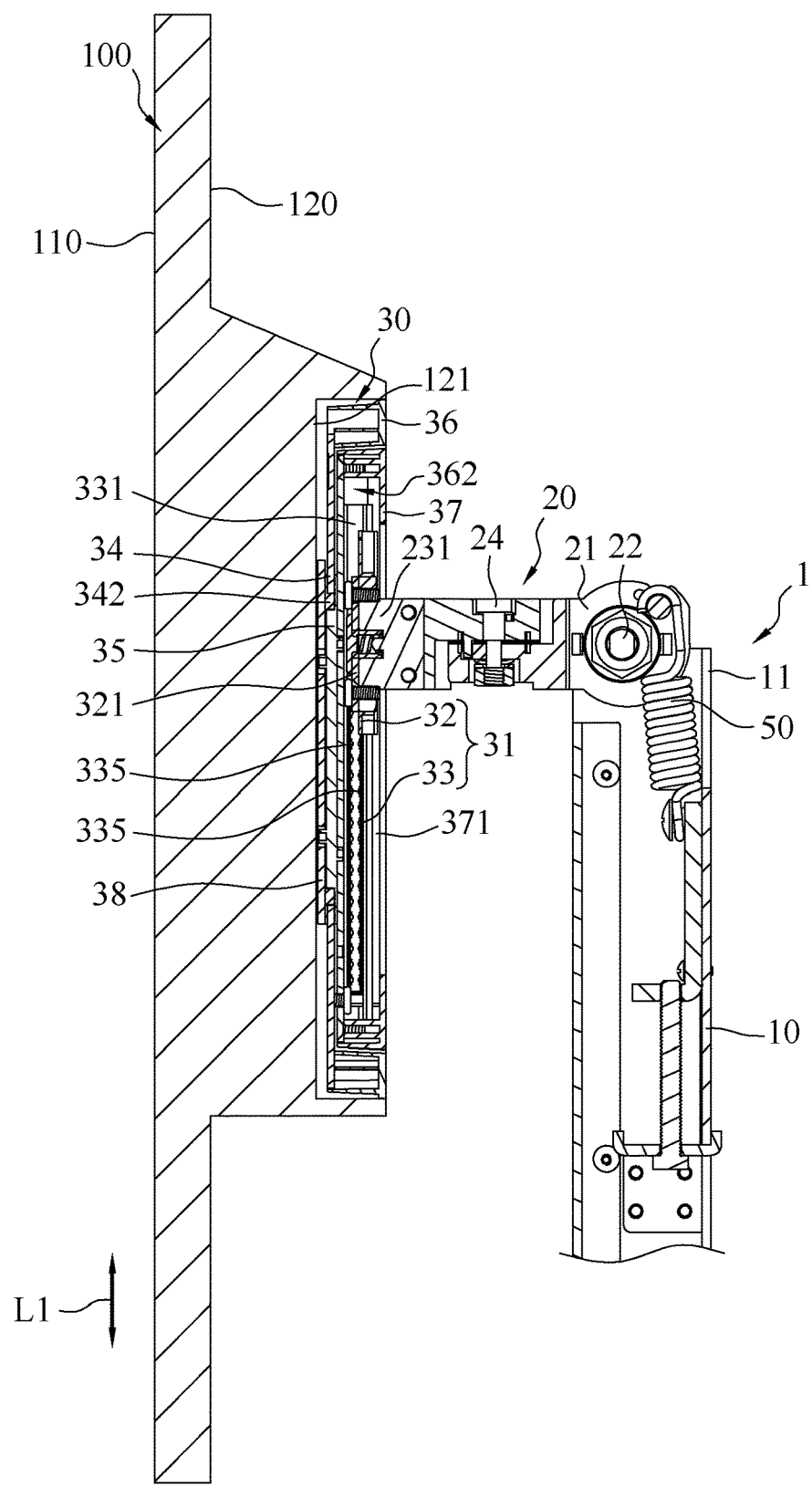
FIG. 5 illustrates a schematic view showing the slide operation of the display apparatus of the exemplary embodiment.

Please refer to FIG. 4 and FIG. 5. In this embodiment, the sliding direction of the slide member 33 of the slide rail structure 31 with respect to the guide member 32 (as the arrow L1 shown in FIG. 5) is the same as the extension direction of the stand body 10. Therefore, when the user has to adjust the height of the display 100, the user can hold the display 100 to move with respect to the guide member 32 and the stand body 10 through the slide member 33 so as to change the height of the display 100. When the display 100 is adjusted to a desired height, the user can stop forcing the display 100, so that the display 100 can be positioned at the desired height through the elastic force of the constant-force spring 40.

In some embodiments, the slide member 33 and the guide member 32 of the slide rail structure 31 may be implemented by using various linear slide structures, such that the slide member 33 is slidable with respect to the guide member 32. As shown in FIG. 3 to FIG. 6, for example, in this embodiment, the slide member 33 is a plate member, and a surface 333 of the slide member 33 facing the stand body 10 has a plurality of slide grooves 331, 332, and the extension direction of the slide grooves 331, 332 is the same as the extension direction of the stand body 10. The slide groove 31 is at a middle portion of the surface 333, and the slide grooves 332 are arranged at two opposite sides of the slide groove 331. The guide member 32 of the slide rail structure 31 is a plate member, and a surface 324 of the guide member 32 facing the slide member 33 comprises a guide plate 321 and a plurality of guide blocks 322. The guide plate 321 is received in the slide groove 331, and the guide blocks 322 are received in the slide grooves 332. Therefore, the slide member 33 is slidable with respect to the guide member 32 stably.

Figure 6:
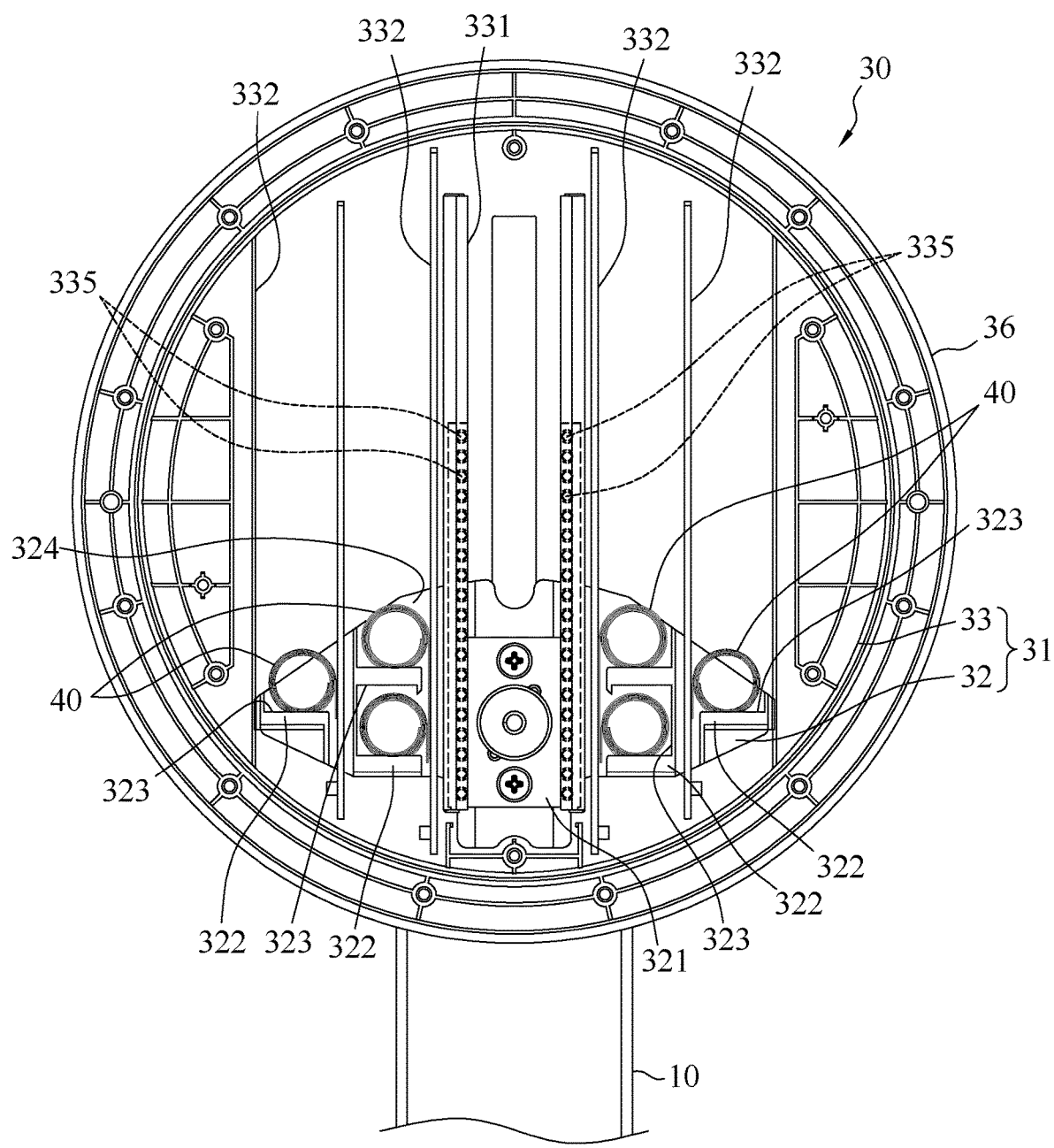
FIG. 6 illustrates a plan view of the display stand holder of the exemplary embodiment.

As shown in FIG. 6, in this embodiment, a plurality of balls 335 is in the slide groove 331 of the slide member 33. The balls 335 are arranged at the opposite two sides of the slide groove 331, and the balls 335 rollably contact the guide plate 321. Therefore, during the process that the slide member 33 slides with respect to the guide member 32, the friction between the guide plate 321 and the slide groove 331 can be greatly reduced, so that the slide member 33 can slide with respect to the guide member 32 more smoothly.

Further, as shown in FIG. 6, in this embodiment, each of the guide blocks 322 of the guide member 32 further has a recess 323, and each of the recesses 323 receives a constant-force spring 40. Therefore, the constant-force spring 40 can be limited properly. Hence, during the process that the slide member 33 slides with respect to the guide member 32, the constant-force spring 40 can be prevented from having deflection or wobbling.

Figure 7:
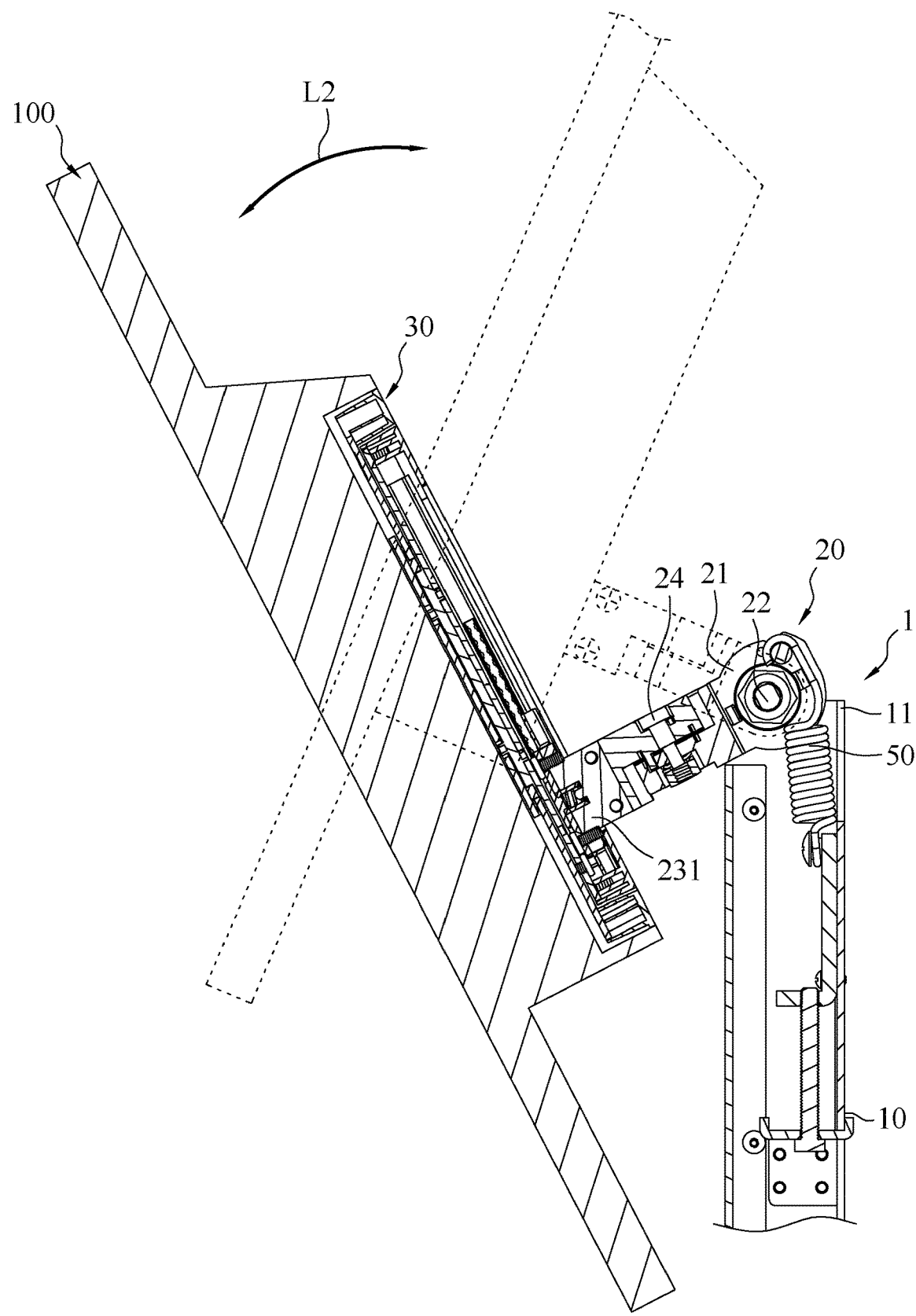
FIG. 7 illustrates a schematic view showing the swing operation of the display stand holder of the exemplary embodiment.
Figure 8:
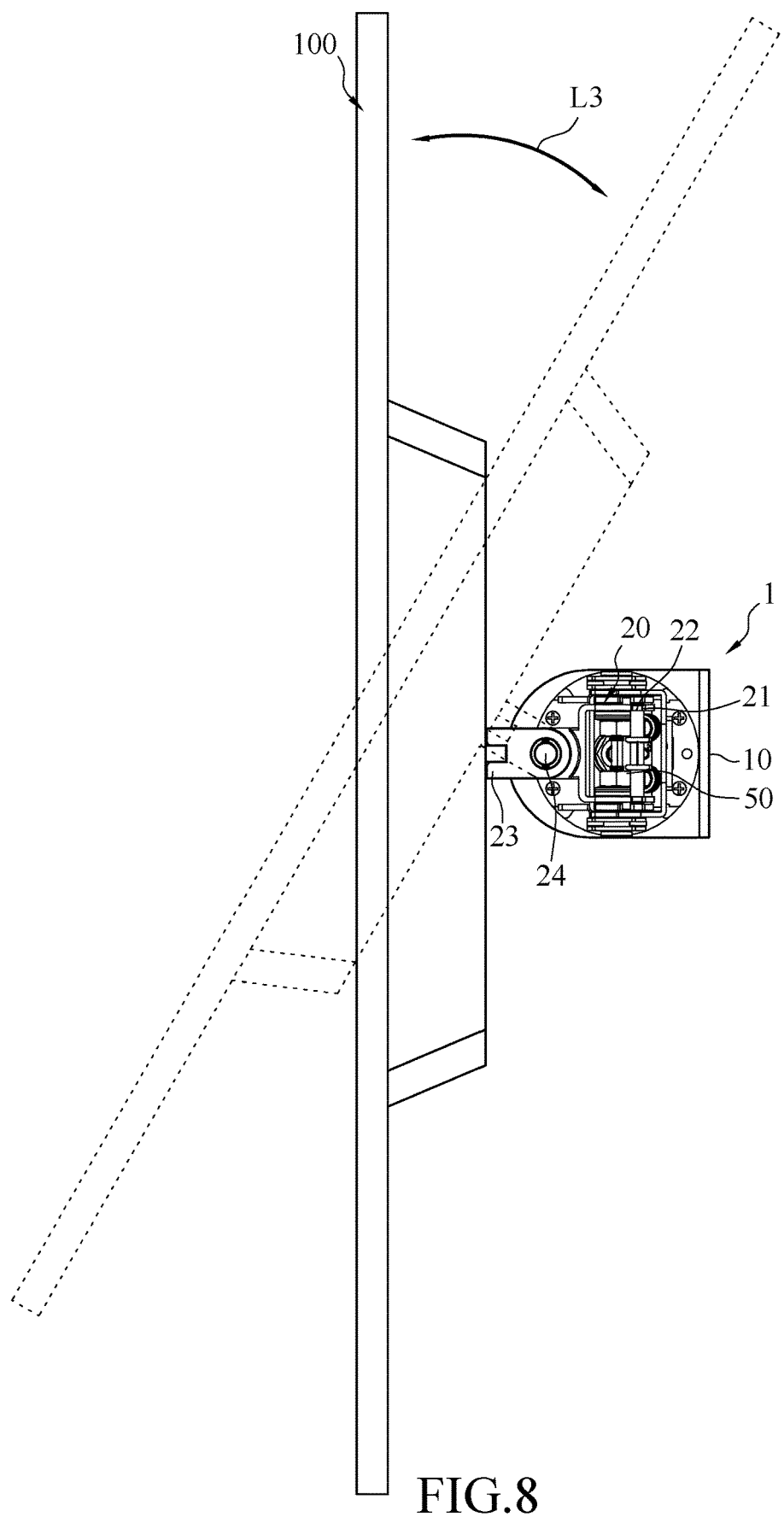
FIG. 8 illustrates another schematic view showing the swing operation of the display stand holder of the exemplary embodiment.

As shown in FIG. 7 and FIG. 8, in this embodiment, since the slide rail structure 31 of the display assembly module 30 is assembled at the second end 23 of the pivot member 20 away from the stand body 10, the display 100 can be kept spaced from the stand body 10 by a certain distance, thereby increasing the adjustable angular range of the display 100. Moreover, since the slide rail structure 31 is not disposed on the stand body 10, the structure of the stand body 10 can be simplified and the appearance of the stand body 10 is not limited.

As shown in FIG. 7, in this embodiment, the axial direction of the pivot portion 22 of the pivot member 20 is perpendicular to the extension direction of the stand body 10. Therefore, after the display 100 is assembled with the display assembly module 30, the display 100 is capable of swinging about the pivot portion 22 upwardly or downwardly with respect to the top end 11 of the stand body 10 (as the arrow L2 shown in FIG. 7), so that the pitch angle of the display 100 (to swing upwardly or downwardly) can be adjusted. Moreover, since the display 100 is kept spaced from the stand body 10 by a certain distance, the adjustable range of the pitch angle of the display 100 is further increased. Furthermore, since the pivot member 20 is pivotally connected to the top end 11 of the stand body 10, the angle to swing the display 100 upwardly is not limited, thereby further increasing the adjustable range of the elevation angle of the display 100.

Figure 3:
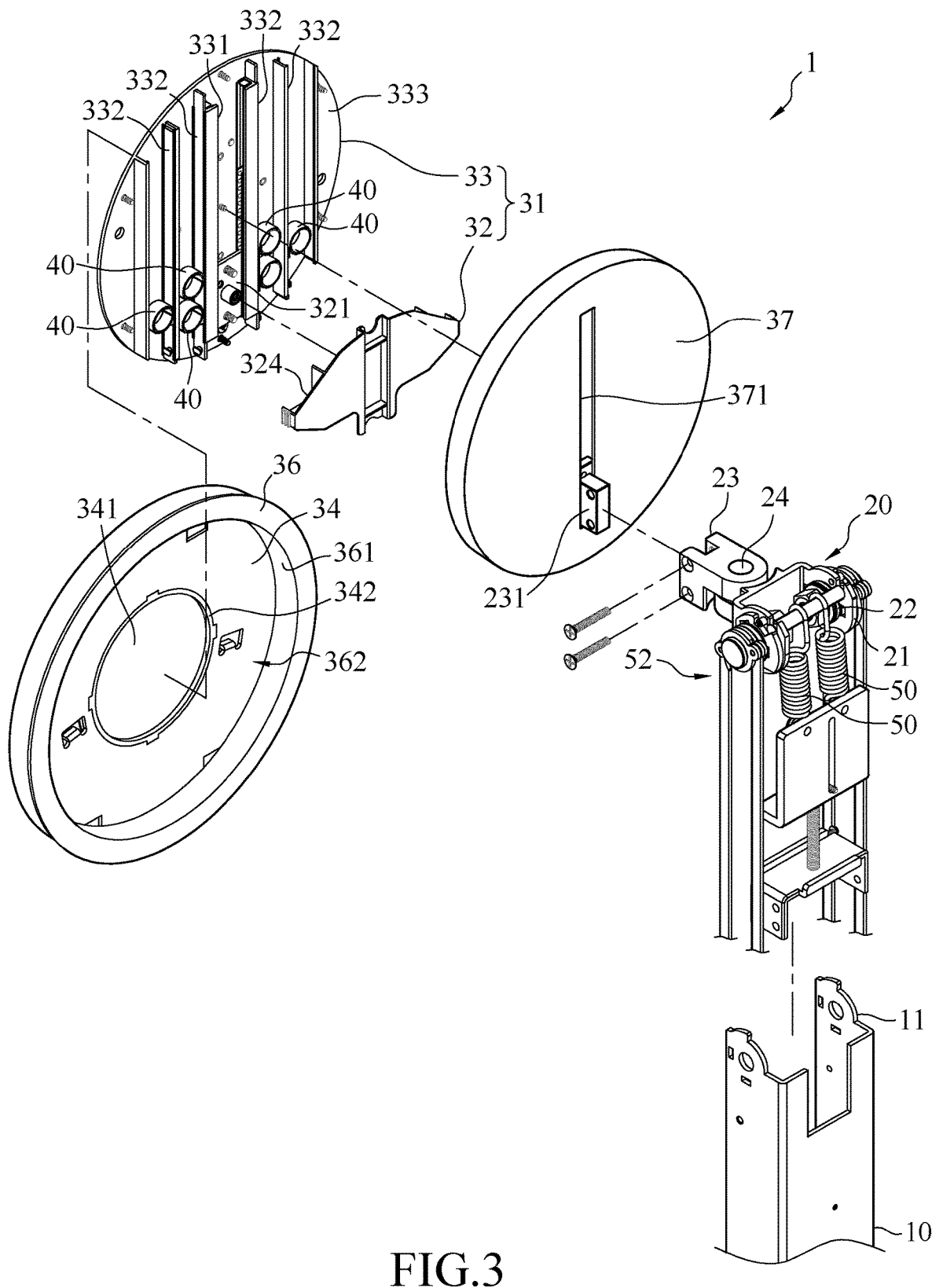
FIG. 3 illustrates an exploded view of a display stand holder according to an exemplary embodiment of the instant disclosure.

As shown in FIG. 3 and FIG. 8, in this embodiment, the pivot member 20 is further provided with a rotation shaft 24 between the first end 21 and the second end 23, and the axial direction of the rotation shaft 24 is perpendicular to the axial direction of the pivot portion 22. Therefore, after the display 100 is assembled with the display assembly module 30, the display 100 is capable of being rotated about the rotation shaft 24 leftward or rightward with respect to the stand body 10 (as the arrow L3 shown in FIG. 8), so that the lateral tilt angle of the display 100 can be adjusted. Moreover, since the display 100 is kept spaced from the stand body 10 by a certain distance, the adjustable range of the lateral tilt angle of the display 100 can be further increased.

Figure 9:
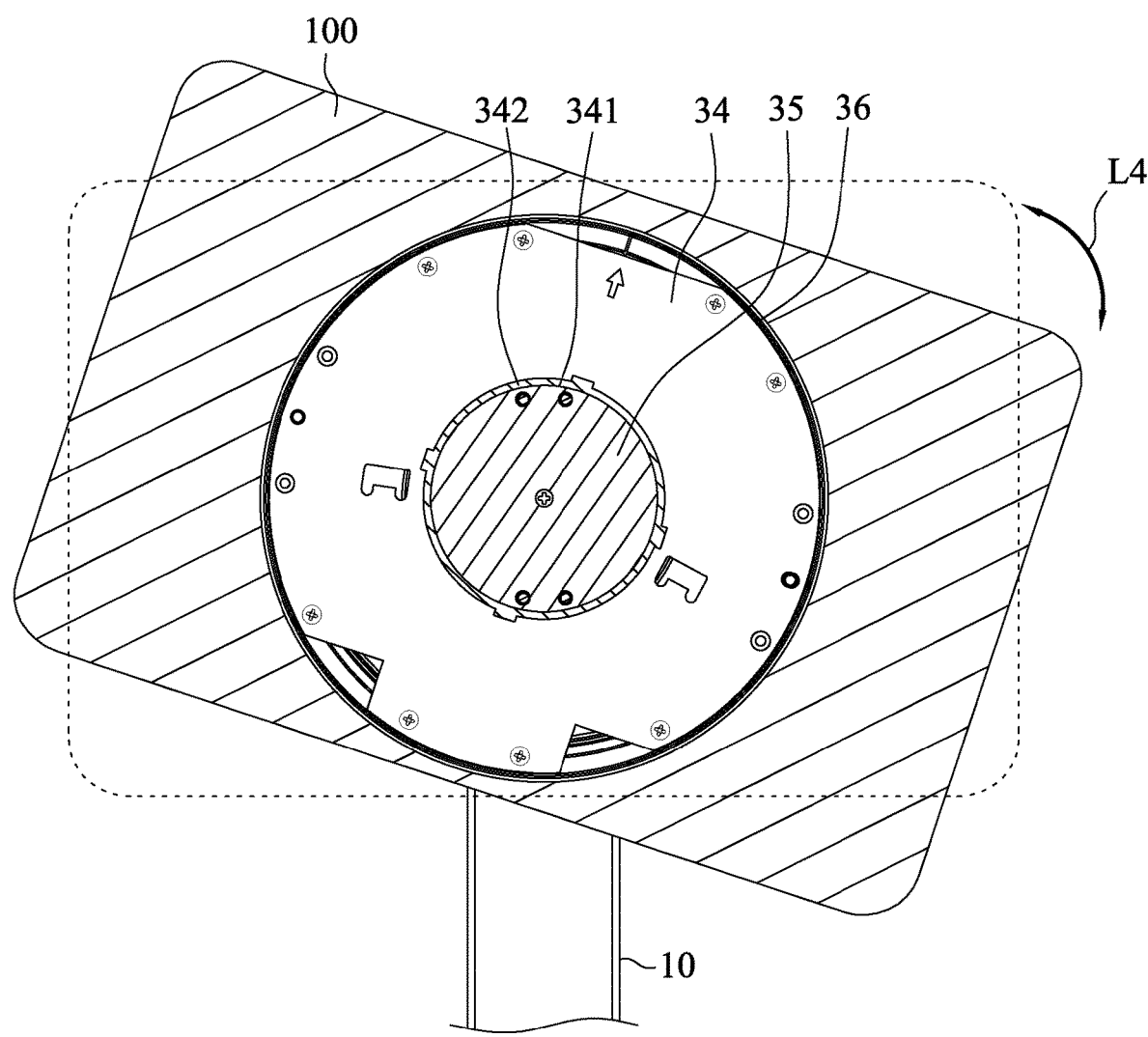
FIG. 9 illustrates a cross-sectional view of the display apparatus along line 9-9 shown in FIG. 1.

As shown in FIG. 2, FIG. 3, and FIG. 9, the display assembly plate 34 is further rotatably assembled on the slide rail structure 31. Therefore, after the display 100 is assembled with the display assembly plate 34, the display 100 not only can be moved upwardly or downwardly for adjusting the height of the display 100 and can be rotated for adjusting the pitch angle and the lateral tilt angle, the display 100 but also can be rotated with respect to the slide rail structure 31 and the stand body 10 (as the arrow L4 shown in FIG. 9), so that the display 100 can be adjusted to different rotation angles.

Further, as shown in FIG. 2, FIG. 3, FIG. 4 and FIG. 9, in this embodiment, the display assembly plate 34 has an axial through hole 341, a damper plate 35 is in the axial through hole 341, one side of the damping plate 35 is fixed to the slide member 33, the other side of the damping plate 35 can be fixed to a plate 38, and the damper plate 35 contacts the display assembly plate 34. Therefore, when the display 100 is rotated to a different position through the display assembly plate 34 with respect to the slide rail structure 31 and the stand body 10, the display 100 can be positioned through the friction between the damper plate 35 and the display assembly plate 34. Moreover, the display assembly plate 34 may further comprise a ring-shaped damper sheet 342, the ring-shaped damper sheet 342 is disposed around a hole edge of the axial through hole 341, and the ring-shaped damper sheet 342 surrounds and contacts the periphery of the damper plate 35. Therefore, the friction between the display assembly plate 34 and the damper plate 35 can be increased to enhance the positioning performance for the display 100.

In some embodiments, the ring-shaped damper sheet 342 and the damper plate 35 may be made of polymer resin material or rubber material, thereby further reducing the noises and shakings of the display assembly plate 34 during the rotation of the display assembly plate 34 and increasing the service lives of the ring-shaped damper sheet 342 and the damper plate 35.

As shown in FIG. 2 and FIG. 3, the display assembly module 30 comprises a ring-shaped frame 36. The ring-shaped frame 36 is connected to a periphery of the display assembly plate 34 and extends toward the stand body 10. The ring-shaped frame 36 has an inner peripheral portion 361, the inner peripheral portion 361 is enclosed to form a receiving groove 362, and the slide rail structure 31 is received in the receiving groove 362. Moreover, one side of the receiving groove 362 adjacent to the pivot member 20 is further provided with a cover plate 37. Therefore, the slide rail structure 31 can be hidden in the receiving groove 362 to improve the aesthetics of the entire display assembly module 30.

Further, as shown in FIG. 3 and FIG. 4, the cover plate 37 has an elongated guide slot 371 in communication with the receiving groove 362. The extension direction of the elongated guide slot 371 is the same as the slide direction of the slide member 33 (as the arrow L1 shown in FIG. 5). The second end 23 of the pivot member 20 is assembled with a slider 231, and the slider 231 is inserted into the elongated guide slot 371 so as to be connected to the guide member 32 of the slide rail structure 31. Therefore, when the display 100 is subjected to a force, the force drives the slide member 33, the display assembly plate 34, the ring-shaped frame 36, and the cover plate 37 to slide with respect to the guide member 32. Moreover, through the configuration of the elongated guide slot 371, the cover plate 37 can be prevented from interfered with or impacting the pivot member 20 during the sliding of the components.

Figure 10:
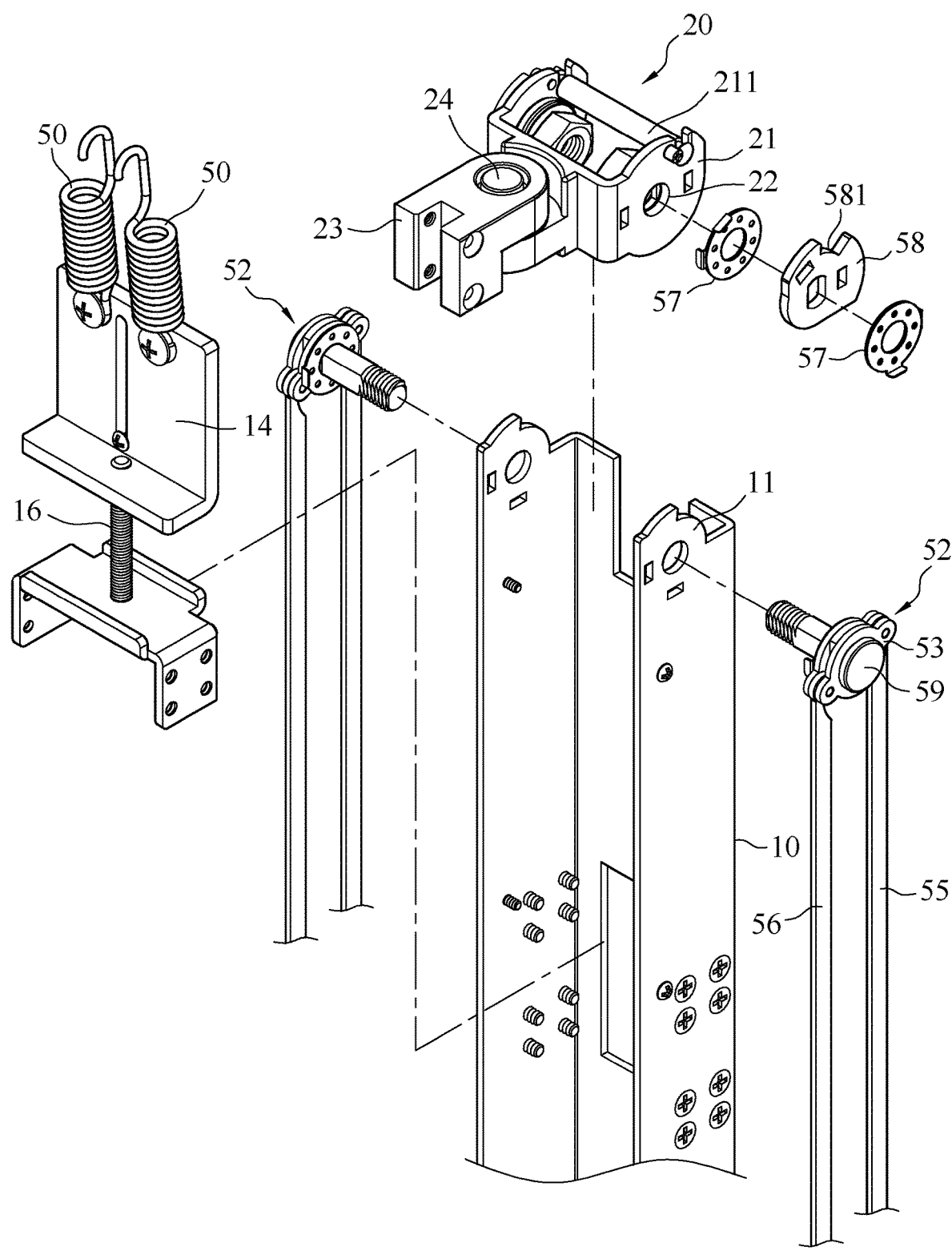
FIG. 10 illustrates an exploded view of a stand body according to an exemplary embodiment of the instant disclosure.

Please refer to FIG. 4 and FIG. 10, at least one elastic member 50 (in this embodiment, the number of the elastic members 50 is two, but embodiments are not limited thereto) is further connected between the first end 21 of the pivot member 20 and the stand body 10. Therefore, after the display 100 swings through the pivot member 20 with respect to the stand body 10 to adjust the angle of the display 100, the display 100 can be positioned through the elastic force provided by the elastic member 50. In this embodiment, the elastic member 50 is an extension spring. One of two ends of the elastic member 50 is connected to the first end 21 of the pivot member 20, and the other end of the elastic member 50 is connected to the stand body 10.

In some embodiments, the elastic member 50 may be other elastic components, such as a torsion spring or a leaf spring.

Figure 11:
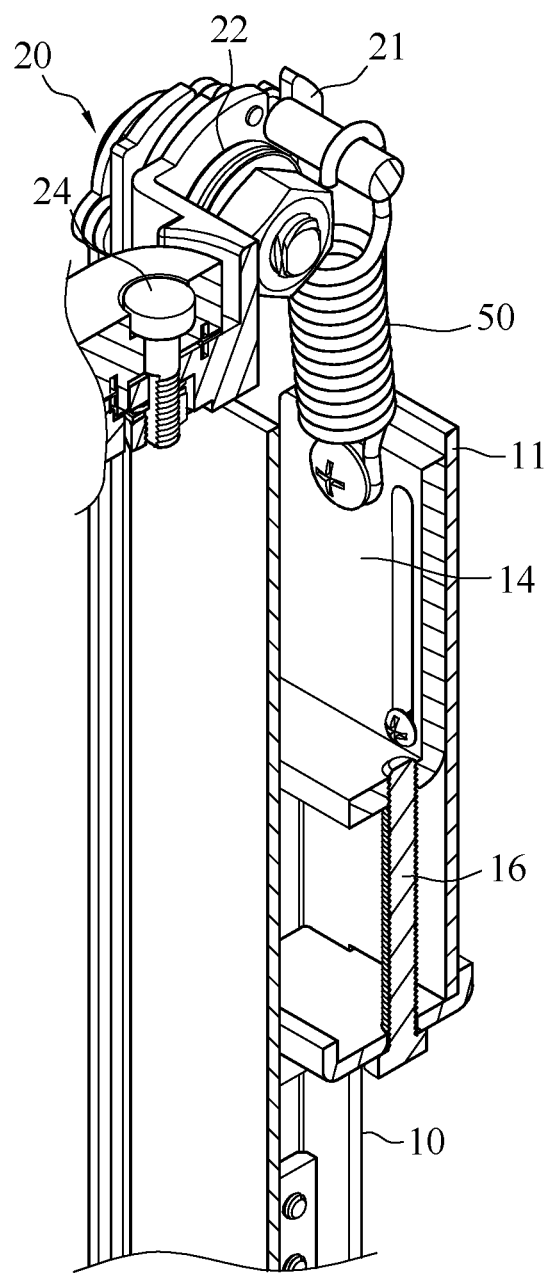
FIG. 11 illustrates a partial cross-sectional view of the stand body of the exemplary embodiment.

As shown in FIG. 10 and FIG. 11, in this embodiment, a movable plate 14 is disposed in the stand body 10. The movable plate 14 is movable with respect to the stand body 10 to adjust the position of the movable plate 14. The other end of the elastic member 50 is connected to the movable plate 14. Therefore, through the movement of the movable plate 14, the extension extent of the elastic member 50 can be adjusted, thereby changing the elastic force of the elastic member 50 according to actual requirements.

Further, as shown in FIG. 11, a transmission element 16 is disposed in the stand body 10. In this embodiment, the transmission component 16 is an elongated bolt, and one end of the transmission element 16 is threaded with the movable plate 14. Therefore, the user can operate the transmission element 16 to rotate so as to drive the movable plate 14 to move with respect to the stand body 10, thereby changing the elastic force of the elastic member 50. However, it is understood that the foregoing embodiments are provided for illustrative purposes, but not limitations of the instant disclosure. In some embodiments, the transmission element 16 may be other transmission structures (such as a chain transmission structure or a gear transmission structure).

Figure 12:
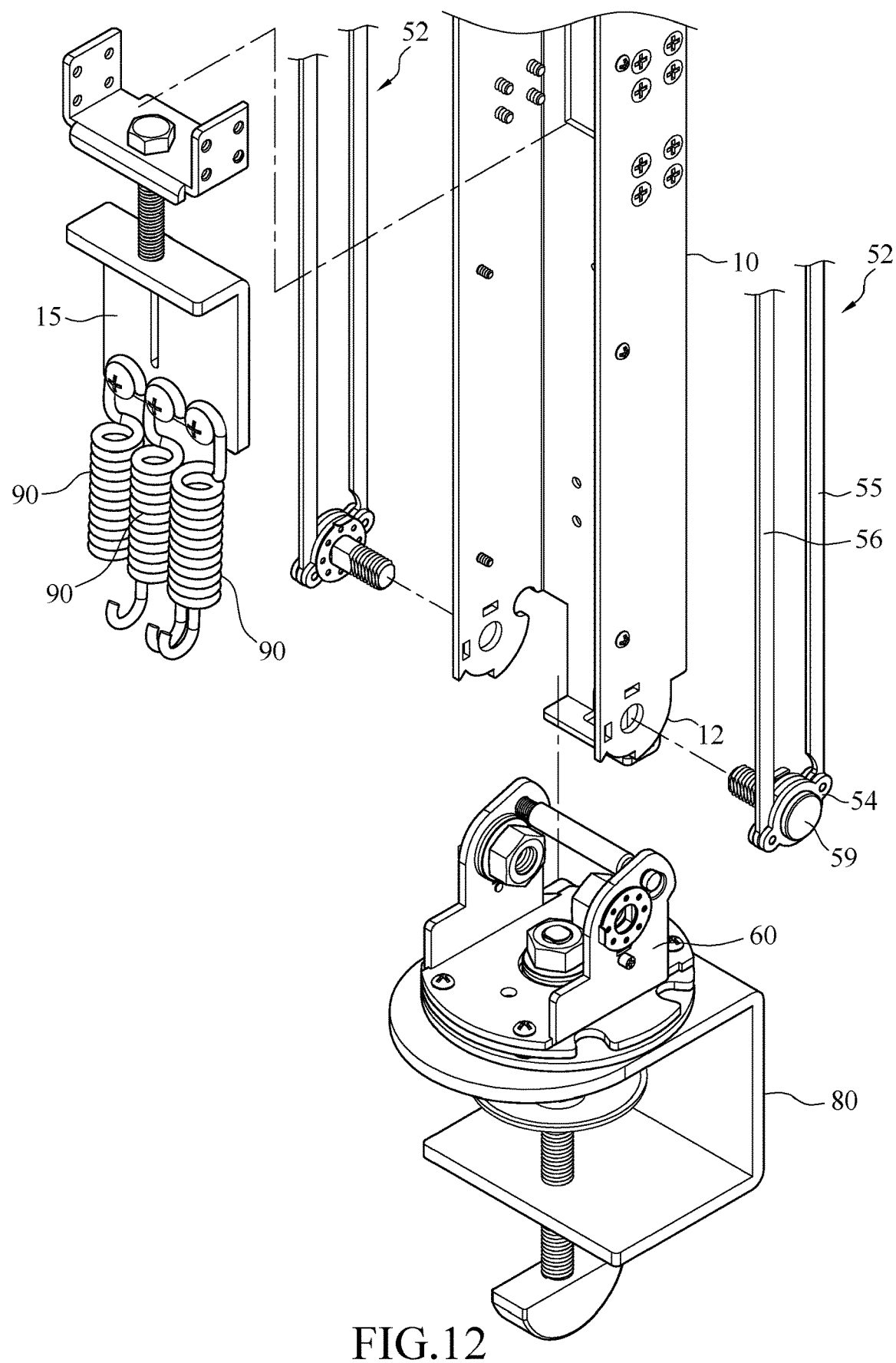
FIG. 12 illustrates another exploded view of the stand body of the exemplary embodiment.
Figure 13:
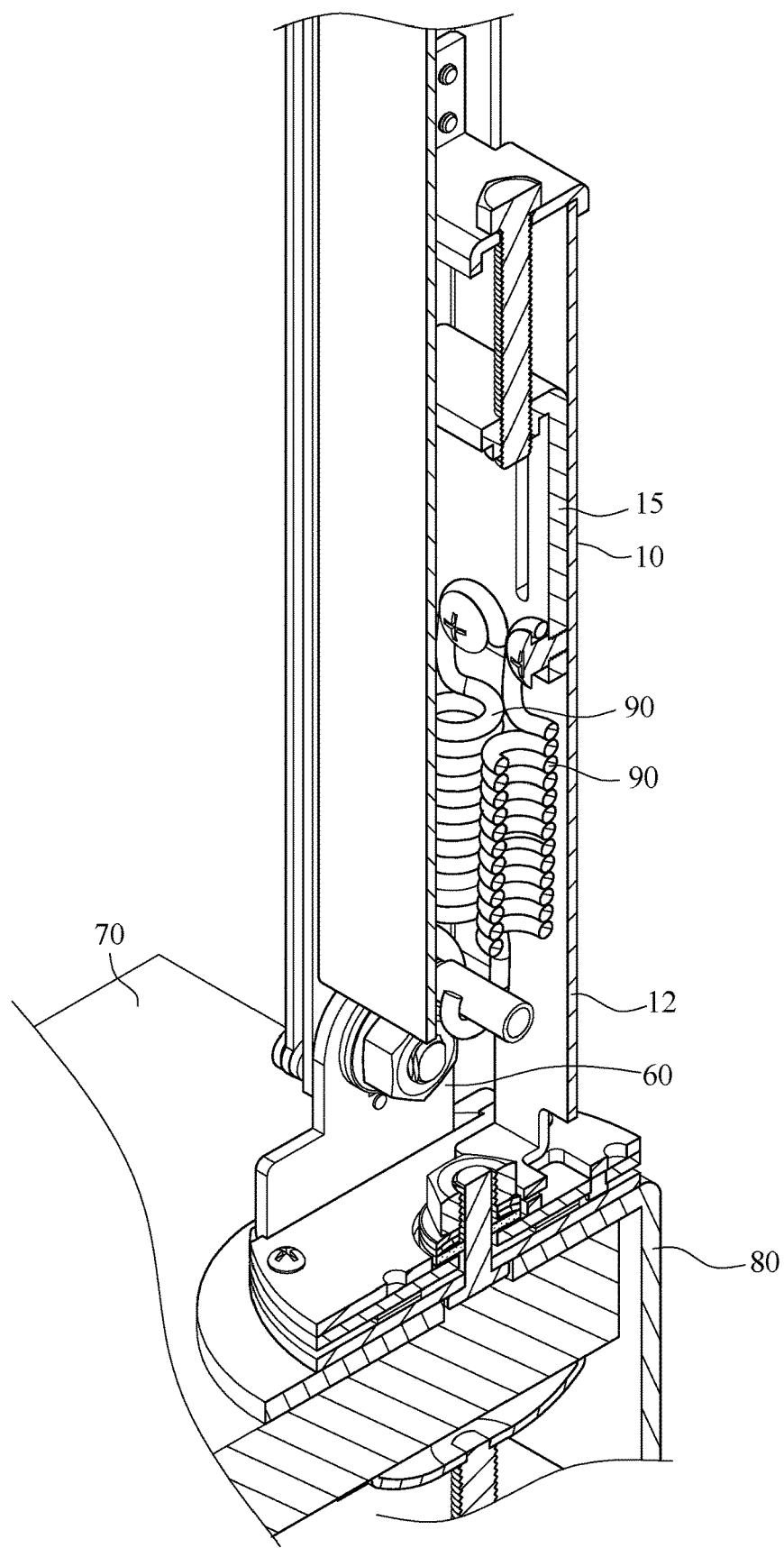
FIG. 13 illustrates another partial cross-sectional view of the stand body of the exemplary embodiment.

In some embodiments, the bottom end 12 of the stand body 10 is further assembled on a base 60, and the base 60 is adapted to be fixed on a desk plate 70 or a desk clip 80. As shown in FIG. 12 and FIG. 13, for example, the base 60 may be directly fixed on a desk plate 70, so that the stand body 10 can be fixed at a predetermined angle. For example, the angle between the stand body 10 and the desk plate 70 may be 30 degrees, 45 degrees, 60 degrees, or 90 degrees. Alternatively, as shown in FIG. 13, the base 60 may be fixed on a desk clip 80. The desk clip 80 can be clipped at the edge of the desk, so that the user can choose the position where the stand body 10 is located on the desk.

As shown in FIG. 12 and FIG. 13, the bottom end 12 of the stand body 10 is pivotally connected to the base 60, so that the stand body 10 is swingable with respect to the base 60 to adjust the tilt angle of the stand body 10, thereby further adjusting the position of the display 100. Moreover, at least one elastic member 90 is connected between the base 60 and the stand body 10 (in this embodiment, the number of the elastic members 90 is three, but embodiments are not limited thereto). Therefore, after the stand body 10 swings with respect to the base 60 to adjust the tilt angle of the stand body 10, the stand body 10 can be positioned through the elastic force provided by the elastic member 90. In this embodiment, the elastic member 90 is an extension spring. One of two ends of the elastic member 90 is connected to the bottom end 12 of the stand body 10, and the other end of the elastic member 90 is connected to the base 60.

In some embodiments, the elastic member 90 may be other elastic components, such as a torsion spring or a leaf spring.

Further, as shown in FIG. 12 and FIG. 13, in this embodiment, a movable plate 15 is disposed in the stand body 10. The movable plate 15 is movable with respect to the stand body 10 to adjust the position of the movable plate 15. The end of the elastic member 90 connected to the stand body 10 is connected to the movable plate 15. Therefore, through the movement of the movable plate 15, the extension extent of the elastic member 90 can be adjusted, thereby changing the elastic force of the elastic member 90 according to actual requirements.

Moreover, please refer to FIG. 10 and FIG. 12. The display stand holder 1 further comprises at least one multi-link assembly 52. In this embodiment, the number of the multi-link assemblies 52 is two, and the two multi-link assemblies 52 are connected to two opposite sides of the stand body 10. The multi-link assembly 52 is adapted to allow the display 100 to be retained at the original viewing angle to prevent the display 100 and the pivot member 20 from swinging along with the swinging of the stand body 10 during the process that the stand body 10 swings with respect to the base 60 to adjust the tilt angle of the stand body 60. The detail operation of the multi-link assembly 52 is provided as below.

As shown in FIG. 10 and FIG. 12, taking one of the multi-link assembly 52 as an example, the multi-link assembly 52 comprises a first connecting rod 53, a second connecting rod 54, a third connecting rod 55, and a fourth connecting rod 56. The first connecting rod 53 is connected to the pivot portion 22 of the pivot member 20, and the top end 11 of the stand body 10 is sandwiched between the first connecting rod 53 and the pivot portion 22, so that the top end 11 of the stand body 10 is still rotatable with respect to the first connecting rod 53 and the pivot portion 22. The second connecting rod 54 is connected to the base 60, and the bottom end 12 of the stand body 10 is sandwiched between the second connecting rod 54 and the base 60, so that the bottom end 12 of the stand body 10 is still rotatable with respect to the second connecting rod 54 and the base 60. The third connecting rod 55 and the fourth connecting rod 56 of the multi-link assembly 52 are parallel with each other. Two ends of the third connecting rod 55 are pivotally connected to the first connecting rod 53 and the second connecting rod 54, and two ends of the fourth connecting rod 56 are pivotally connected to the first connecting rod 53 and the second connecting rod 54. Therefore, in this embodiment, the multi-link assembly 52 is formed as a parallel four connecting rod structure.

Figure 14:
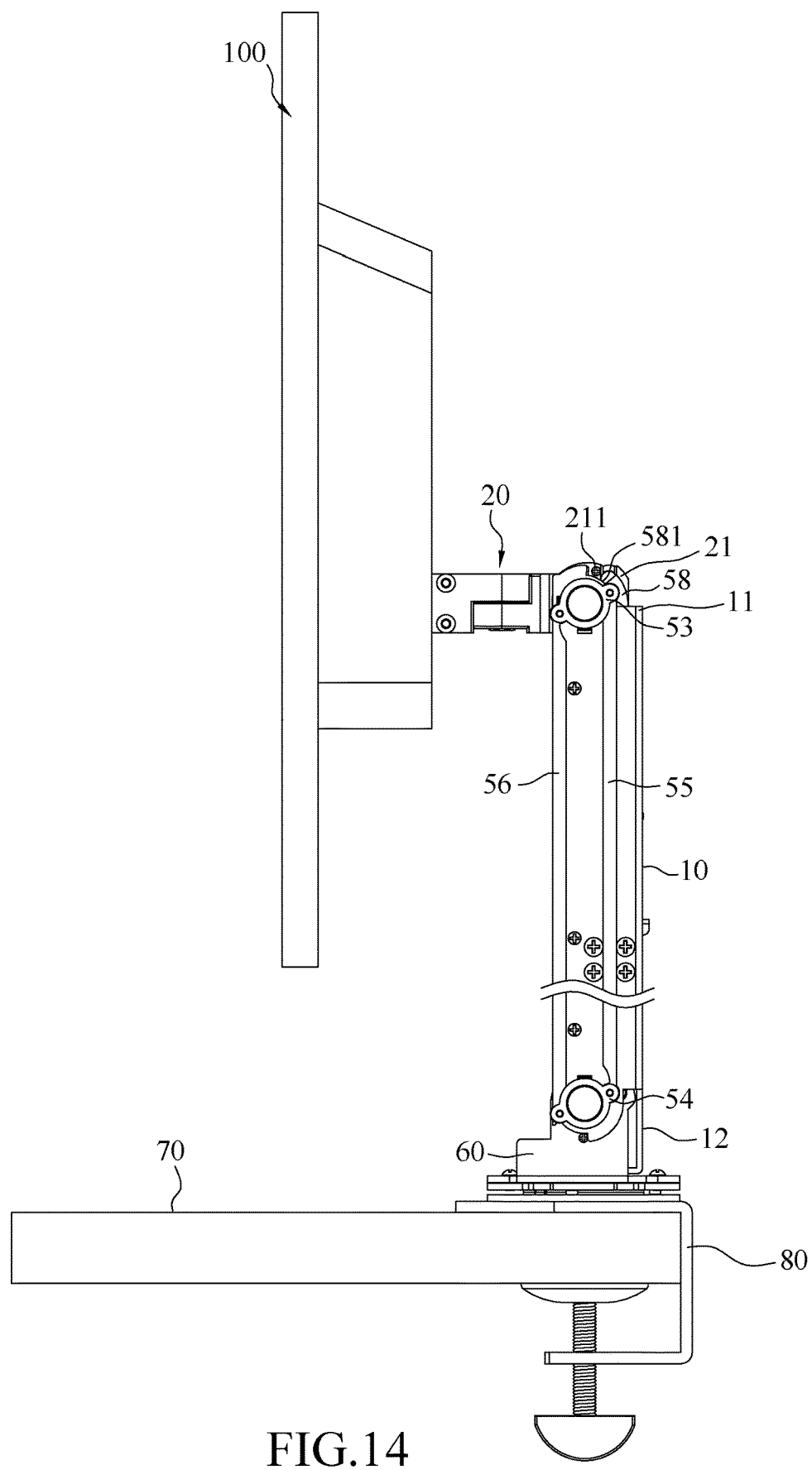
FIG. 14 illustrates a schematic view showing the stand body of the exemplary embodiment is standing.
Figure 15:
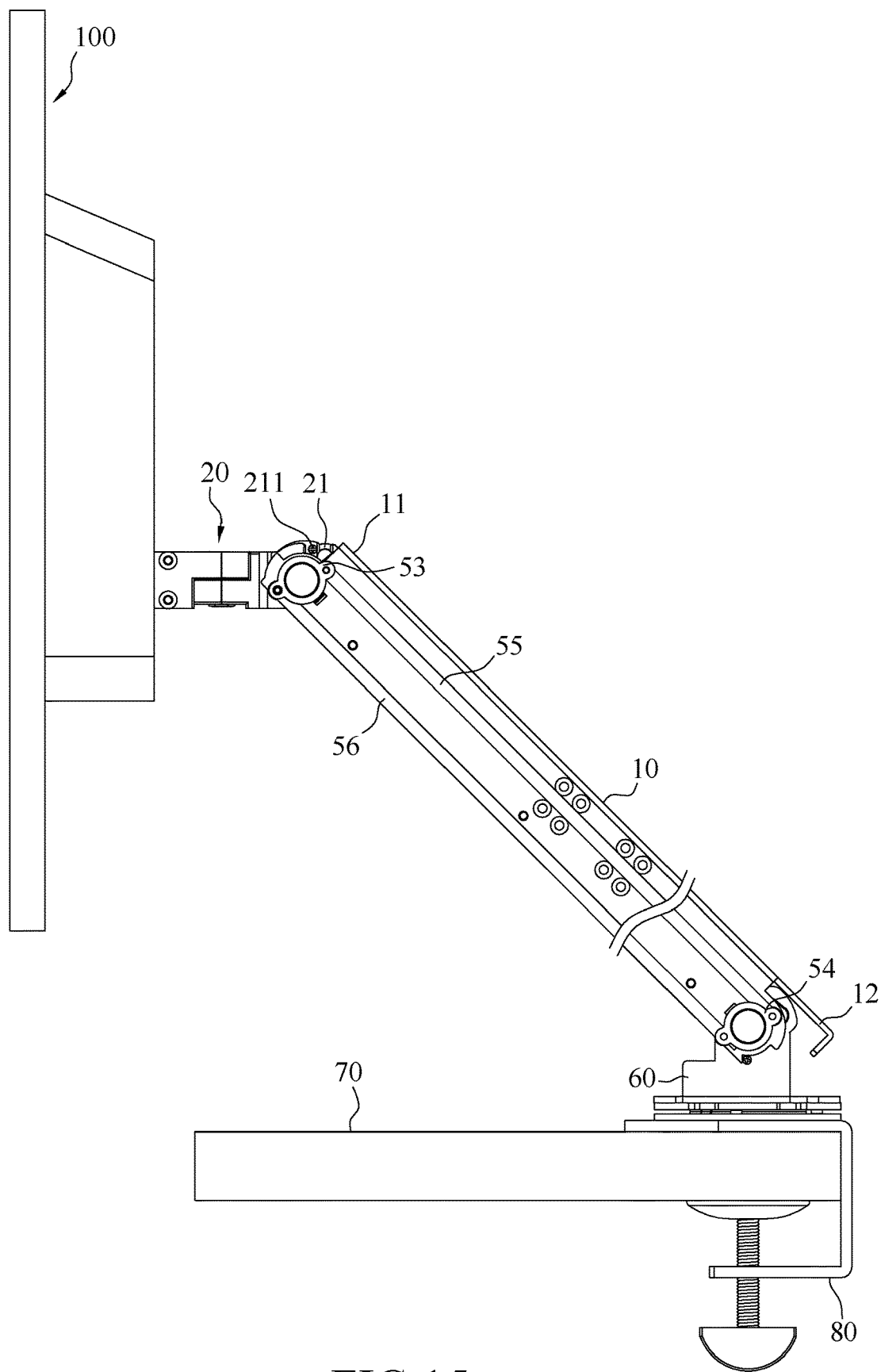
FIG. 15 illustrates a schematic view showing the stand body of the exemplary embodiment is swinging.

Therefore, as shown in FIG. 14 and FIG. 15, when the user operates the stand body 10 to swing with respect to the base 60 to adjust the tilt angle of the stand body 10, the top end 11 of the stand body 10 is rotatable with respect to the pivot member 20, and the bottom end 12 of the stand body 10 is rotatable with respect to the base 60. Moreover, the third connecting rod 55 and the fourth connecting rod 56 of the multi-link assembly 52 are also swingable with respect to the first connecting rod 53 and the second connecting rod 54, so that the third connecting rod 55 and the fourth connecting rod 56 swing along with the swinging of the stand body 10, thereby changing the tilt angle of the stand body 10. Moreover, since the pivot portion 22 of the pivot member 20 is connected to the first connecting rod 53, the pivot portion 22 of the pivot member 20 can be limited by the multi-link assembly 52 and does not rotate with respect to the stand body 10. Therefore, the display 100 connected to the pivot member 20 can be retained at the original viewing angle.

As shown in FIG. 10, the display stand holder 1 may further comprise a plurality of bolts 59. The first connecting rod 53 of the multi-link assembly 52 can be connected to the pivot portion 22 of the pivot member 20 by inserting the bolts 59 into the top end 11 of the stand body 10, and the top end 11 of the stand body 10 can be sandwiched between the first connecting rod 53 and the pivot portion 22. As shown in FIG. 12, the second connecting rod 54 of the multi-link assembly 52 can be connected to the base 60 by inserting the bolts 59 into the bottom end 12 of the stand body 10, and the bottom end 12 of the stand body 10 can be sandwiched between the second connecting rod 54 and the base 60. However, it is understood that the assembling configuration of the multi-link assembly 52 is provided as an illustrative example, but not limitations of the instant disclosure.

As shown in FIG. 10, in this embodiment, the display stand holder 1 further comprises at least one friction sheet 57 (in this embodiment, the number of the friction sheet 57 is two, but embodiments are not limited thereto). The friction sheet 57 contacts the first end 21 of the pivot member 20 and the top end 11 of the stand body 10. Therefore, when the stand body 10 is rotated with respect to the pivot member 20 and the base 60 to a different tilt angle, the positioning of the stand body 10 at the angle can be enhanced through the friction among the friction sheet 57, the pivot member 20, and the stand body 10.

Further, as shown in FIG. 10, the display stand holder 1 further comprises an angular limit plate 58. The angular limit plate 58 is disposed between the first end 21 of the pivot member 20 and the top end 11 of the stand body 10. Moreover, the angular limit plate 58 has a limit notch 581, the first end 21 of the pivot member 20 is provided with a limit block 211, the limit block 211 is received in the limit notch 581, and the width of the limit notch 581 is greater than the width of the limit block 211. Therefore, as shown in FIG. 14 and FIG. 15, when the stand body 10 is rotated with respect to the pivot member 20 and the base 60, the rotatable angle of the stand body 10 can be limited through the angular limit plate 58 and the limit block 211.

Based on the above, according to one or some embodiments of the instant disclosure, the slide rail structure 31 of the display assembly module 30 is assembled at the second end 23 of the pivot member 20 away from the stand body 10. Therefore, not only the position of the display 100 can be adjusted according to different user requirements, but also the adjustable angular range of the display 100 can be further increased. Moreover, since the slide rail structure 31 of the display assembly module 30 is not disposed on the stand body 10, the structure of the stand body 10 can be simplified and the appearance of the stand body 10 is not limited.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A display stand holder comprising:
   a stand body having a top end;
   a pivot member having a first end and a second end, wherein the first end is provided with a pivot portion, the pivot portion is pivotally connected to the top end of the stand body, and the second end is away from the top end with respect to the first end;
   a display assembly module disposed at the second end of the pivot member, wherein the display assembly module comprises a slide rail structure, the slide rail structure comprises a guide member and a slide member, and the slide member is slidably assembled on the guide member; and
   at least one constant-force spring connected between the guide member and the slide member;
   wherein the display assembly module comprises a display assembly plate and a ring-shaped frame, the ring-shaped frame is connected to a periphery of the display assembly plate to form a receiving groove, and the slide rail structure is received in the receiving groove; the guide member is fixed at the second end of the pivot member, the display assembly plate has an axial through hole, and a damper plate is located in the axial through hole; the damper plate having a first side fixed to the slide member and a second side fixed to a plate on an outer surface of the display assembly plate so that the display assembly plate is rotatably assembled to the slide member and slidable together with respect to the guide member; the display assembly plate has a ring-shaped damper sheet, the ring-shaped damper sheet is disposed around a hole edge of the axial through hole, and the ring-shaped damper sheet surrounds and contacts the periphery of the damper plate.

2. The display stand holder according to claim 1, wherein one side of the receiving groove adjacent to the pivot member is provided with a cover plate, the cover plate has an elongated guide slot, the second end of the pivot member is assembled with a slider, and the slider is inserted into the elongated guide slot.

3. The display stand holder according to claim 1, wherein the slide member has a slide groove, the guide member comprises a guide plate, and the guide plate is received in the slide groove.

4. The display stand holder according to claim 3, wherein a plurality of balls is in the slide groove, and the plurality of balls rollably contact the guide plate.

5. The display stand holder according to claim 3, wherein the slide member has a second slide groove; the guide member comprises a guide block, the guide block is received in the second slide groove, the guide block has a recess, and the at least one constant-force spring is received in the recess.

6. The display stand holder according to claim 1, wherein the pivot member is further provided with a rotation shaft between the first end and the second end, and an axial direction of the rotation shaft is perpendicular to an axial direction of the pivot portion.

7. The display stand holder according to claim 1, further comprising an elastic member connected between the first end of the pivot member and the stand body.

8. The display stand holder according to claim 1, further comprising a base, wherein the stand body has a bottom end, the bottom end is pivotally connected to the base, and the base is adapted to be fixed on a desk plate or a desk clip.

9. The display stand holder according to claim 8, further comprising an elastic member connected between the base and the stand body.

10. The display stand holder according to claim 8, further comprising a multi-link assembly, wherein the multi-link assembly comprises a first connecting rod, a second connecting rod, a third connecting rod, and a fourth connecting rod; the first connecting rod is connected to the pivot portion of the pivot member, and the second connecting rod is connected to the base; the third connecting rod and the fourth connecting rod are parallel with each other, two ends of the third connecting rod are pivotally connected to the first connecting rod and the second connecting rod, and two ends of the fourth connecting rod are pivotally connected to the first connecting rod and the second connecting rod.

11. The display stand holder according to claim 1, further comprising a friction sheet, wherein the friction sheet contacts the first end of the pivot member and the top end of the stand body.

12. The display stand holder according to claim 1, further comprising an angular limit plate, wherein the angular limit plate is disposed between the first end of the pivot member and the top end of the stand body; the angular limit plate has a limit notch, the first end of the pivot member is provided with a limit block, and the limit block is in the limit notch.

13. A display apparatus comprising:
the display stand holder according to claim 1; and
a display having a front surface and a rear surface, wherein the rear surface is provided with an assembly groove, and the display assembly module is assembled in the assembly groove.

14. The display apparatus according to claim 13, wherein the display assembly module comprises a ring-shaped frame, the ring-shaped frame is connected to a periphery of the display assembly plate to form a receiving groove, and the slide rail structure is received in the receiving groove.

15. The display apparatus according to claim 14, wherein one side of the receiving groove adjacent to the pivot member is provided with a cover plate, the cover plate has an elongated guide slot, the second end of the pivot member is assembled with a slider, and the slider is inserted into the elongated guide slot.

16. The display apparatus according to claim 13, wherein the slide member has a slide groove, the guide member comprises a guide plate, and the guide plate is received in the slide groove.

17. The display apparatus according to claim 16, wherein a plurality of balls is in the slide groove, and the plurality of balls rollably contact the guide plate.

18. The display apparatus according to claim 16, wherein the slide member has a second slide groove; the guide member comprises a guide block, the guide block is received in the second slide groove, the guide block has a recess, and the at least one constant-force spring is received in the recess.

19. The display apparatus according to claim 13, wherein the pivot member is further provided with a rotation shaft between the first end and the second end, and an axial direction of the rotation shaft is perpendicular to an axial direction of the pivot portion.

20. The display apparatus according to claim 13, further comprising an elastic member connected between the first end of the pivot member and the stand body.

21. The display apparatus according to claim 13, further comprising a base, wherein the stand body has a bottom end, the bottom end is pivotally connected to the base, and the base is adapted to be fixed on a desk plate or a desk clip.

22. The display apparatus according to claim 21, further comprising an elastic member connected between the base and the stand body.

23. The display apparatus according to claim 21, further comprising a multi-link assembly, wherein the multi-link assembly comprises a first connecting rod, a second connecting rod, a third connecting rod, and a fourth connecting rod; the first connecting rod is connected to the pivot portion of the pivot member, and the second connecting rod is connected to the base; the third connecting rod and the fourth connecting rod are parallel with each other, two ends of the third connecting rod are pivotally connected to the first connecting rod and the second connecting rod, and two ends of the fourth connecting rod are pivotally connected to the first connecting rod and the second connecting rod.

24. The display apparatus according to claim 13, further comprising a friction sheet, wherein the friction sheet contacts the first end of the pivot member and the top end of the stand body.

25. The display apparatus according to claim 13, further comprising an angular limit plate, wherein the angular limit plate is disposed between the first end of the pivot member and the top end of the stand body; the angular limit plate has a limit notch, the first end of the pivot member is provided with a limit block, and the limit block is in the limit notch.

\* \* \* \* \*